Oct. 13, 1931.     F. KUSTERLE     1,827,320
CASTER MOUNTING MEANS
Filed July 19, 1929

Inventor
Frank Kusterle
By Fisher, Clapp, Soans & Pond  Attys

Patented Oct. 13, 1931

1,827,320

UNITED STATES PATENT OFFICE

FRANK KUSTERLE, OF KENOSHA, WISCONSIN, ASSIGNOR TO SIMMONS COMPANY, OF NEW YORK, N. Y., A CORPORATION OF DELAWARE

CASTER MOUNTING MEANS

Application filed July 19, 1929. Serial No. 379,376.

This invention relates to caster mounting means and has particular reference to improved means for anchoring the caster or a caster element on the end of the leg of an article of furniture or the like.

The objects of the invention are to provide means for effectively anchoring a caster or a caster element on the end of a furniture or like leg; to provide means for anchoring the part as an incident to the normal operation of mounting the caster element on the leg; to provide means such as above referred to which can be manufactured cheaply and economically, and in general, it is the object of my invention to provide an improved caster mounting means such as above referred to.

Other objects and advantages will be understood by reference to the following specification and accompanying drawings wherein I have described and illustrated mounting means of the type referred to as applied to a caster socket.

Figure 1:
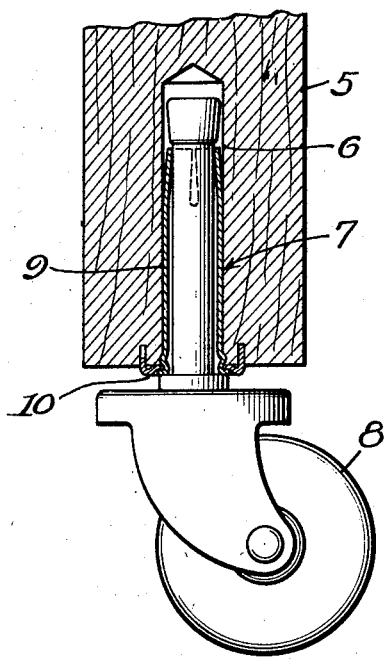
Fig. 1 is a sectional view of the lower end of a leg having a caster mounted therein through the agency of a caster socket which embodies a selected form of my present invention.
Figure 2:
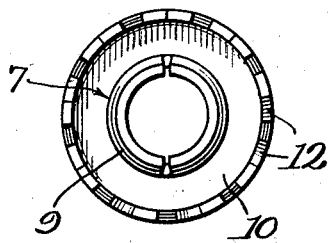
Fig. 2 is a plan of the caster socket.

Referring now to the drawings, I have indicated in Fig. 1 a wooden furniture leg 5 having a bore 6 which receives a caster socket 7, the latter being adapted to removably and swivelly receive a caster 8 of conventional construction.

In the embodiment of my invention herein disclosed, my invention concerns only the means for anchoring, more or less permanently, the socket element 7 in the leg 5. As shown, the socket element 7 includes a tubular part 9 which is provided with a bottom plate 10 anchored to the tubular member at the lower end of the latter in any suitable manner. The bottom plate 10, in the present instance, is circular in form and is provided around its periphery with a laterally upwardly extending flange 11 which terminates in a plurality of upwardly extending teeth or prongs 12.

Figure 3:
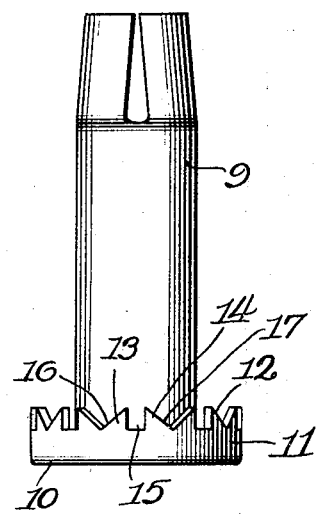
Fig. 3 is a side elevation of the caster socket.
Figure 4:
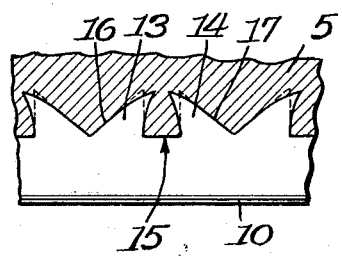
Fig. 4 is a diagrammatic side elevation of a part of the caster socket illustrating the manner in which the same is anchored in the leg.

As clearly shown in Fig. 3, the prongs 12 are arranged in pairs, one pair of which includes prongs such as 13 and 14. The respective prongs of each pair are spaced apart as indicated at 15, the adjacent faces of the prongs being preferably substantially parallel as shown. The outer or remote faces or edges of the prongs of each pair are oppositely inclined as indicated at 16 and 17. The bottom plate and its prongs are made of sufficiently ductile metal so that when the prongs are driven endwise into the end of the leg, the oppositely inclined faces 16 and 17 will serve to deflect the prongs in opposite directions (towards each other) as clearly indicated in Fig. 4. In the said Fig. 4, the normal or initial position of the prongs is indicated in broken lines, and the deflected, operative position of the prongs is indicated in full lines. It will be seen that the deflected prongs serve to form, in effect, a dove tail interlocking connection between the bottom plate of the socket and the furniture leg.

The above described form of anchoring means is obviously applicable to other types of caster sockets as well as to the caster element, for instance gliding caster buttons, and I am aware that changes may be made in the arrangement of the prongs and their inclined portions so as to obtain substantially the same result but without departing from the spirit of my invention, the scope of which should be determined by reference to the following claim, construing the same as broadly as possible consistent with the state of the art.

I claim as my invention:

A caster element having a plurality of prongs adapted to be driven endwise into a furniture leg, or the like, said prongs being arranged in pairs having oppositely inclined outer edge portions and substantially parallel inner edge portions, whereby, when the prongs are driven into the leg, the prongs of each pair are deflected towards each other so as to form, in effect, a dove-tail interlocking connection between the leg and the caster element.

FRANK KUSTERLE.